US 6,628,422 B2

(12) United States Patent
Ouchi (10) Patent No.: US 6,628,422 B2
(45) Date of Patent: *Sep. 30, 2003

(54) IMAGE FORMING SYSTEM AND SCANNER HAVING DIRECT IMAGE FORMING FUNCTION

(75) Inventor: Tetsuya Ouchi, Tajimi (JP)

(73) Assignee: Brother Kogyo Kabushiki Kaisha, Nagoya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/926,678

(22) Filed: Sep. 10, 1997

(65) Prior Publication Data

US 2002/0063872 A1 May 30, 2002

(30) Foreign Application Priority Data

Sep. 12, 1996 (JP) .............................................. 8-241968

(51) Int. Cl.[7] .............................................. G06F 00/15
(52) U.S. Cl. .......................................... 358/1.6; 358/1.1
(58) Field of Search ................................. 395/652, 712, 395/101; 358/501, 518, 404, 444, 468, 442, 1.15, 1.16, 1.9, 1.13, 1.14; 382/167; 713/2; 717/11

(56) References Cited

U.S. PATENT DOCUMENTS 4,952,972 A * 8/1990 Someya ........................ 355/68

| 5,185,673 A | * | 2/1993 | Sobol | 358/296 |
| 5,280,367 A | * | 1/1994 | Zuniga | 358/462 |
| 5,467,433 A | * | 11/1995 | Lamprecht, Jr. et al. | 395/114 |
| 5,664,074 A | * | 9/1997 | Kageyama et al. | 358/1.14 |
| 5,664,194 A | * | 9/1997 | Paulsen | 395/712 |
| 5,726,778 A | * | 3/1998 | Tanio | 358/501 |
| 5,822,508 A | | 10/1998 | Ohara | |
| 5,841,991 A | * | 11/1998 | Russell | 709/221 |
| 6,185,010 B1 | * | 2/2001 | Watanabe | 358/474 |

FOREIGN PATENT DOCUMENTS

JP          08317120 A       11/1996

* cited by examiner

Primary Examiner—Gabriel Garcia
(74) Attorney, Agent, or Firm—Oliff & Berridge, PLC (57) ABSTRACT

In order to achieve image direct-forming from a scanner to a printer, an image forming system is provided with an image forming apparatus, a host apparatus, a selecting unit and a scanner. The host apparatus stores image forming control data and programs set according to the type of the printer, and outputs them at a given time event. The selecting unit is used to select an image direct-forming mode from a plurality of image forming modes. The scanner reads image information on an object and generates image data. The scanner includes a rewritable nonvolatile memory having a storage capacity enough to store one of the control data or program associated with at least one type of the printer, and a control unit for storing, into the memory, at least one of the control data or program outputted from the host apparatus. The control unit further processes the image data according to at least one of the control data or program when the image direct-forming mode is selected, and outputs the processed image data to the printer.

23 Claims, 9 Drawing Sheets

IMAGE FORMING SYSTEM AND SCANNER HAVING DIRECT IMAGE FORMING FUNCTION

BACKGROUND OF THE INVENTION

The present invention relates to a system for printing images, and more particularly to an image forming system capable of directly supplying image data scanned by a scanner to an image forming apparatus, such as a printer, without the aid of a host apparatus, such as a personal computer, intervening therebetween.

According to known image forming systems for printing images on recording materials such as copy papers, image data of characters, drawings, photos, and the like are first read by a scanner to provide the read image data to a host apparatus in which they are processed in appropriate manners, and the processed image data are then supplied from the host apparatus to an image forming apparatus such as a printer.

However, the foregoing conventional systems have the following drawback. For example, when employing as an image forming apparatus an ink-jet type color printer, the properties of ink and the printing methods are different from each other for each kind of printer. Thus, for sending out data from the host apparatus to the printer, it is necessary that the host apparatus have a certain adjusting means for color conversion data, color conversion programs, or the like.

This kind of problem is not limited only to the ink-jet color printer. Namely, when using a variety of monochrome (black-and-white) type printers as an image forming apparatus, data for setting print density, half tone and others should be provided in a printer, resulting in the same problem as mentioned above.

SUMMARY OF THE INVENTION

It is an object of the present invention to provide an image forming system capable of forming images by directly transmitting image data scanned by a scanner to an image forming apparatus, such as a printer, of various types, without the increase in amount of the conversion data or program data.

It is another object of the present invention to provide a scanner for use in the above image forming system.

In the present invention, the term "image" is used as a representative of pieces of information including characters, drawings, photos, and others printed on objects to be scanned.

According to one aspect of the present invention, there is provided an image forming system including: an image forming apparatus for forming an image on a recording material using image data produced from image information represented on an object; a host apparatus including: first memory for storing control data or a program being set according to a type of the image forming apparatus and being executed for controlling the image forming apparatus; and a control unit for outputting the control data or the program stored in the first memory at a given time event; and a scanner including: an image reading unit for reading the image information on the object and generating the image data corresponding to the information; a second memory being rewritable and having a memory capacity capable to store the control data or the program which are associated with the image forming apparatus; and a control unit for storing, into the second memory, the control data and the program outputted from the host apparatus, for processing the image data generated by the image reading unit according to the control data and the program stored, and for outputting the processed image data to the image forming apparatus.

In accordance with the system thus configured, at a time when the operational environment of the scanner is set, the control data or program of the image forming apparatus is outputted from the control unit of the host apparatus to the scanner. The control data or program is stored in the rewritable memory by the control unit of the scanner. This eliminates the necessity of previously storing, into the memory of the scanner, plural kinds of control data or a program each corresponding to plural types of image forming apparatus. Like in the host apparatus, an appropriate control is carried out in the scanner in agreement with the types of the image forming apparatus. In the scanner, image information represented on an original printing (object to be scanned) is read to generate an image data by image reading unit. The generated image data are then processed with the help of the control data or program, and supplied to the image forming apparatus. As a result, image data read by the scanner are suitably processed depending on types of imaging printing apparatus and directly supplied thereto, without being routed to the host apparatus.

Therefore, amounts of data which should be stored into the memory unit of the scanner can be reduced, because it is not necessary that the memory unit previously store the plural kinds of control data or program in association with a plural types of image forming apparatus. In addition, image data are processed in accordance with the type of image forming apparatus and printed in the high-speed and simple manner.

It is preferred that the host apparatus or the scanner includes a selecting unit for selecting one of an image direct-forming mode in which image data corresponding to the image information are directly sent from the scanner to the image forming apparatus and an image indirect forming mode in which the image data are sent from the scanner to the image forming apparatus through the host apparatus. In a preferred example, the image forming apparatus is exchangeably connectible, and the control unit outputs the control data or the program corresponding to the image forming apparatus which is connected to the system. It is also preferred that the given time event includes a time event for setting of an operational environment of the scanner.

In a preferred example, a program for driving the scanner may be installed in the host apparatus and the setting of the operational environment of the scanner may include at least one of installation of the program for driving the scanner in the host apparatus and activation of power of the host apparatus. According to such preferred example, at a time when the scanner driver program is installed in the host apparatus or the power of the host apparatus is activated, the control data or program are outputted from the host apparatus to the scanner. Hence, before the scanner is used, the control data or program are firmly stored in the memory of the scanner. This enables direct forming of images between the scanner and the image forming apparatus.

As another preferred example, the control data and program may include color conversion data, a color conversion program for printing a color image, and an interface program intervening between the host apparatus and the image forming apparatus. By this, the color conversion data or color conversion program or the interface program between the host apparatus and the image forming apparatus are stored in the memory of the scanner, which makes it possible that the image data read by the scanner are properly processed in agreement with types of image forming apparatus, although they are not outputted to the host apparatus. Even when the image forming apparatus is changed from one type to another, color images of preferable quality can be formed by the changed image forming apparatus to which image data are sent directly from the scanner.

According to another aspect of the present invention, there is provided a scanner connected to a host apparatus and an image forming apparatus for forming an image on a recording material using image data produced from image information represented on an object, the scanner including: an image reading unit for reading the image information on the object and generating image data according to the image information; a memory being rewritable and having a memory capacity for storing control data or a program for controlling the image forming apparatus, the control data and program corresponding to the image forming apparatus; and a control unit for storing, into the memory, the control data or program outputted from the host apparatus so that the image reading unit reads the image information on the object and produces the image data, for processing the image data on the basis of the control data and program stored, and for outputting the processed image data to the image forming apparatus.

According to the scanner thus configured, at a time when the control data or program are outputted from the control unit of the host apparatus to the scanner, they are stored into the rewritable memory by the control unit of the scanner. This eliminates the necessity of previously storing, into the memory of the scanner, plural kinds of control data or a program each corresponding to plural types of image forming apparatus. Like in the host apparatus, an appropriate control is carried out in the scanner in agreement with types of the image forming apparatus. This control starts in response to the inputted signal indicative of the image direct-producing mode. In the scanner, image information represented on an original printing (object to be scanned) is read to generate an image data by image reading unit. The generated image data are then processed with the help of the control data or program, and provided to the image forming apparatus. As a result, image data read by the scanner are suitably processed depending on types of imaging printing apparatus and directly provided thereto, without being routed to the host apparatus.

Therefore, amounts of data which should be stored into the memory of the scanner can be reduced, because it is not necessary that the memory previously store the plurality of control data or program in association with plural types of image forming apparatus. Since plural kinds of printing control data or program are not necessary to be previously stored in the scanner for each type of image forming apparatus possibly used, the capacity of the memory of the scanner can be reduced. In addition, the image direct-producing mode enables fast and simplified color image forming even when image forming apparatus are exchanged.

The control unit may store the control data or the program in response to a given signal indicative of an image direct-forming mode. In a preferred example, the control data or program may include color conversion data, a color conversion program for printing a color image, and an interface program intervening between the host apparatus and the image forming apparatus. According to the scanner thus configured, the color conversion data or program, or the interface program between the host apparatus and the image forming apparatus are stored in the memory of the scanner.

The image data read by the scanner are not routed to the host apparatus and suitably processed in the scanner according to a type of each image forming apparatus. This also leads to efficient direct forming of color images between the scanner and an image forming apparatus for an updated type thereof.

In a preferred example, the scanner may include the selecting unit for providing the signal in response to selection of the image direct-forming mode. By this, when the image direct-forming mode is selected by the selecting unit in the scanner, direct forming of images is carried out between the scanner and the image forming apparatus, even in a condition that the power of the host apparatus is off. Therefore, image forming under the image direct-forming mode can be carried out through the same operation as a usual scan mode under which image data scanned are sent out to the host apparatus.

According to still another preferred example, the rewritable memory may be a flash EEPROM. Since the volatile and rewritable memory consists of a flash EEPROM, it is less expensive and larger in capacity, and rewritable in all the bits or the block unit. Thus, when image forming apparatus are altered from one to another, the memory data can be reloaded at one time to efficiently and steadily store the control data or program of a relatively large amount. Furthermore, the flash EEPROM are less expensive than a full-featured EEPROM, and hence the cost of scanner can be reduced.

DESCRIPTION OF THE PREFERRED EMBODIMENTS

Preferred embodiments of the present invention will now be described below with reference to the accompanying drawings.

[I] First Embodiment

Figure 1:
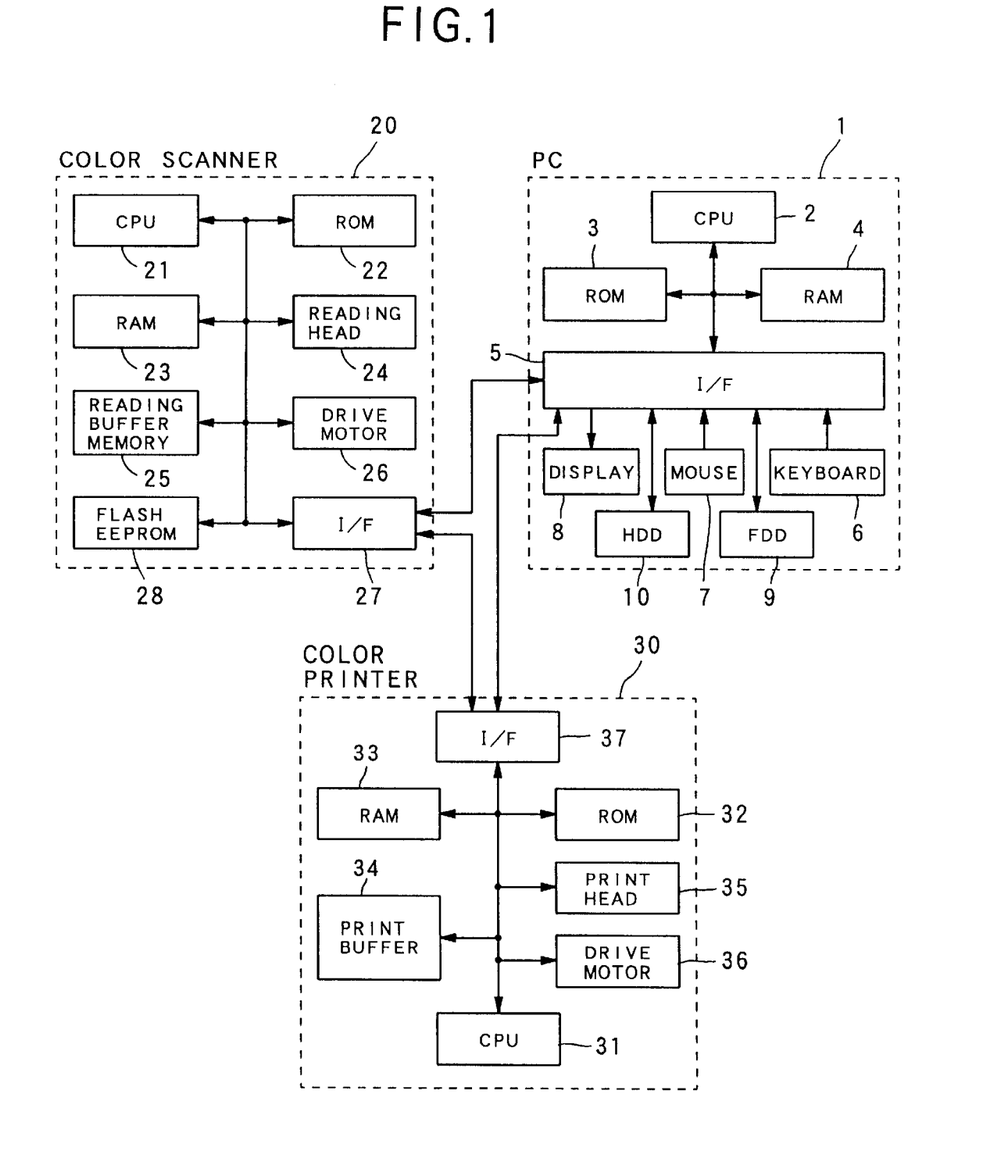
FIG. 1 is a block diagram illustrating hardware configuration of an image forming system according to a first embodiment of the present invention.

A first embodiment of the present invention will be described with reference to FIGS. 1 to 5. FIG. 1 shows a block diagram of hardware of an image forming system according to the first embodiment of the present invention.

The image forming system is provided with a PC (personal computer) 1 serving as a host apparatus as shown in FIG. 1, where the hardware configuration of the PC 1 is represented. The PC 1 is provided with a CPU 2 serving as a control means and consisting of a microprocessor and other units, a ROM 3 for storing control programs and others, a RAM 4 for storing various data, and an I/F (interface) 5 having input and output ports.

To the I/F 5 are connected a keyboard 6, a mouse 7, a display 8, a FDD (Floppy Disk Drive) 9, and a HDD (Hard Disk Drive) 10 as well as a color scanner 20 and a color printer 30 serving as an image forming apparatus, both of which will be described later. The connections of the color scanner 20 and color printer 30 to the PC 1 are achieved, for example, by Centronics-type parallel interfaces.

The color scanner 20 is provided with a CPU 21 functioning as control means, a ROM 22 for storing control programs, a RAM 23 for storing various data including reading resolution data of the scanner, a reading head 24 for reading, as image data, images on objects to be scanned (for example, character-written manuscripts, drawings, photos etc.), a reading buffer memory 25 for temporarily storing the image data read by the reading head 24, a drive motor 26 carrying at least one of the object to be scanned and the reading head 24, a parallel I/F 27 connecting the PC 1 to the printer 30, and a flash EEPROM 28 functioning as a memory means and storing therein data downloaded from the PC 1.

In this configuration, upon receiving an interrupt request command, the image data stored in the reading buffer memory 25 are supplied to either the PC 1 or the printer 30. That is, in the image forming system, there are prepared two types of printing modes; an "image indirect-forming mode" and an "image direct-forming mode". The former corresponds to a method which has been used so far, in which image data read by the scanner are once routed to the PC for data processing. By contrast, the latter is featured by the present invention in a manner that image data for printing are directly sent from the scanner to the printer.

Next, an explanation will be given of the color printer 30 employed as an image forming apparatus and connected to the PC 1 and scanner 20. This embodiment uses the color printer 30 of an ink-jet type. As shown in FIG. 1, the printer 30 is provided with a CPU 31 serving as a control means, a ROM 32 for storing control programs therein, a RAM for storing a variety of data such as color adjustment data and others, a print buffer memory 34 for temporarily storing data to be printed, a print head 35 for printing, a drive motor 36 moving the print head 35 and recording materials such as papers, and a parallel I/F 37 connecting the PC 1 to the scanner 20.

Figure 2:
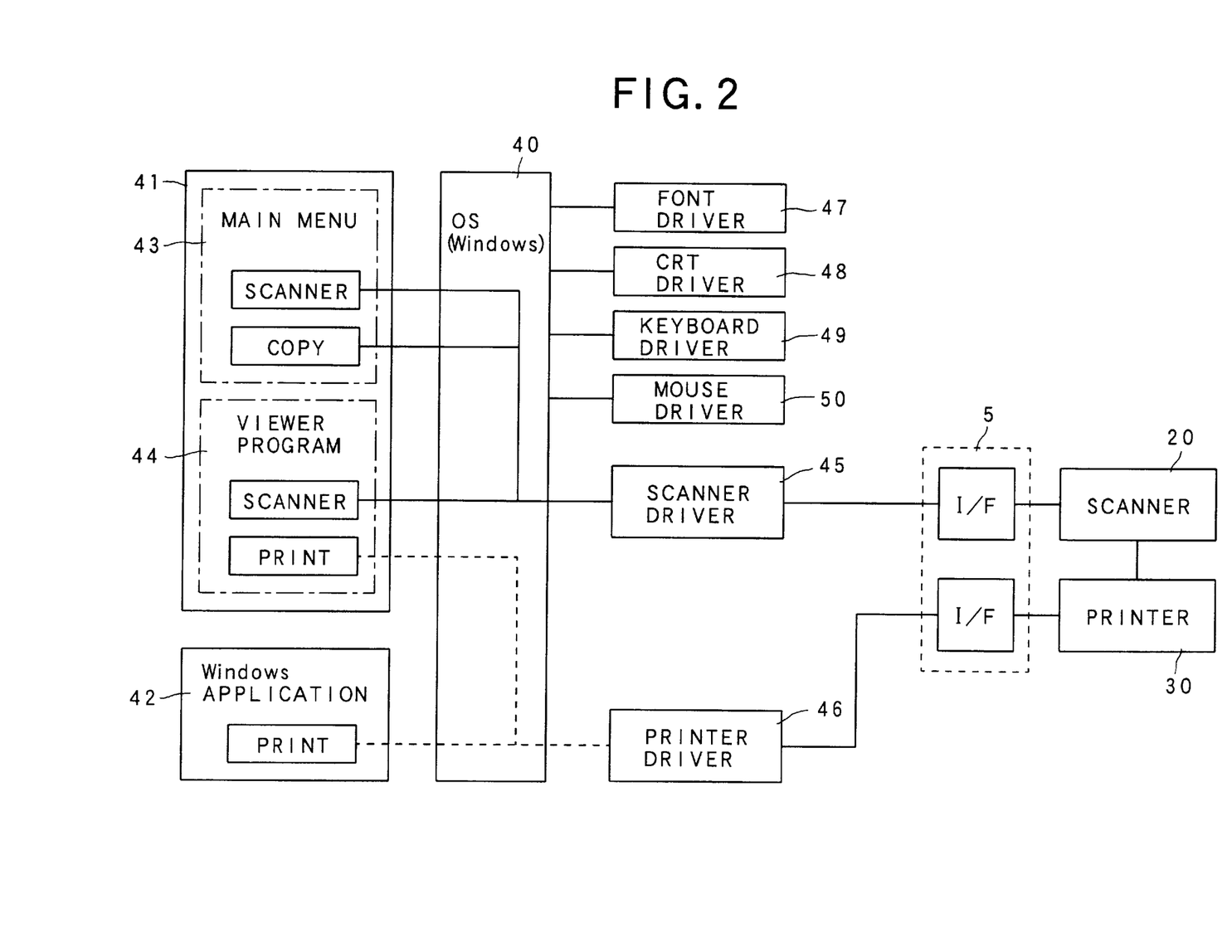
FIG. 2 is a block diagram illustrating a functional configuration of software installed in the system with the devices arranged in the system.

Next, the functional configuration of software of the system will be explained by referring to FIG. 2. The system of the present invention uses "Windows" (by Microsoft) as an operating system (OS). As shown in FIG. 2, application programs are installed to operate on the OS 40, which include an application program 41 belonging to the scanner 20 for reading image data to display them on the screen, and a general application program 42 such as a word processor program.

Figure 3:
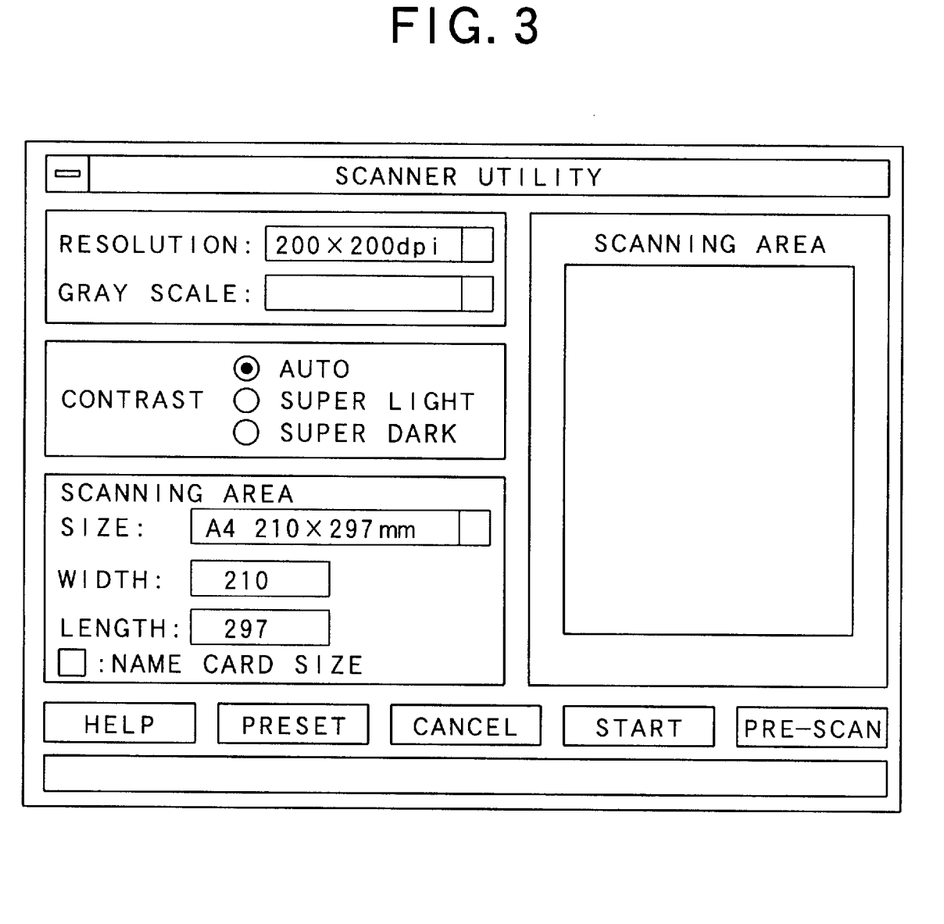
FIG. 3 shows an example of a schematic view displayed on the screen when executing scanning by starting application programs in the first embodiment.

When the application program 41 belonging to the scanner 20 booted up, a "scanner" button, which is displayed when a main menu 43 or viewer program 44 is selected, is clicked. In response to the click, a dialog box for scanning operation is displayed on the screen, as shown in FIG. 3, to enable a user to set various settings items. The setting items include resolutions, gray scales, scan sizes, and a "start" button for starting scanning, and other buttons are also displayed. A scanner driver program 45 not only displays these setting items and other information on the screen but also permits the execution of scanning based on those set data or an instruction of start. In scanning, the scanner driver program 45 sends, to the viewer program 44, image data sent via the I/F 5 from the scanner 20. The viewer program 44 displays the received image data on the screen. When the "pre-scan" button is selected, the scanner driver program 45 also functions to temporarily display, on the screen, the contents of image data sent from the scanner 20 through the I/F 5. Specifically, the scanner driver program 45 displays pre-scanned image data within a scanning area defined in the dialog box shown in FIG. 3.

The scanner driver program 45, which functionally intervenes between the application programs 41 and the scanner 20, helps data transmission/reception therebetween and operates on the OS 40.

When the general application program 42 such as word processor software is booted, a printer driver program 46 can be booted-up by selecting commands of printing and others on the application 42. This results in the display of a dialog box for printing, on the screen, similar to that shown in FIG. 3, thus enabling the setting of the resolutions, paper sizes, color adjustment data and others as well as the input of a printing start command. The printer driver program 46 functionally intervenes between the application program 42 and the printer 30 in order to help the data transmission/reception therebetween. Specifically, the printer driver program 46, which operates on the OS 40, produces print data recognizable by the printer 30 and sends it to the printer 30 through the I/F 5.

Access methods of the PC 1 to the scanner 20 or printer 30 differ dependently upon the hardware configuration of the scanner 20, printer 30, or PC 1. However, it is difficult to alter the access methods of the application programs 41 and 42 to meet each hardware environment. To avoid such a difficulty, the driver programs 45 and 46 are provided to functionally intervene between the application programs 41 and 42 and the scanner 20 and printer 30, respectively. This makes it possible to unify the access methods from the application programs 41 and 42, and to permit the driver programs 45 and 46 to absorb differences in the foregoing various access methods.

Likewise, other programs are provided to operate on the OS 40, which include a font driver program 47 for controlling fonts, a CRT driver program 48 for controlling a display, a keyboard driver program 49 for controlling a keyboard, and a mouse driver program 50 for controlling a mouse.

Next, the operation according to the "image indirect-forming mode" will be described.

In the above-described configuration, when the application program 41 booted up, clicking the "scanner" button displayed in the main menu 43 or clicking the "scanner" button in the display screen of the viewer program 44 causes the scanner driver 45 operate to display a dialog box shown in FIG. 3. In this state, if a reading command is inputted by pressing the "start" button, the scanner driver program 45 sends the reading command to the scanner 20 through the parallel I/F of the I/F 5. Upon receiving this command, the scanner 20 drives the reading head 24 to read image data. The read image data are sent, line by line, to the scanner driver program 45 via the parallel I/F 27 of the scanner 20 and the parallel I/F of the I/F 5 of the PC 1. The image data received by the program 45 are then format-converted line by line therein and stored in the HDD 10 shown in FIG. 1.

When completing storage of one page of image data into the HDD 10 through repetition of reading image data by a unit of one line, the scanner driver program 45 notifies the viewer program 44 of the completion as well as necessary information including the addresses of the stored image data. Responsively to this notification, the viewer program 44 makes an access to the HDD 10 to display the read image data on the screen. Since the viewer program 44 is set to be automatically booted when the scanner driver program 45 is booted-up through the main menu 43, the image data is displayed on the screen in the same manner even if the scanner driver program 45 is booted from the main menu 43.

For printing the above image data by the printer 30, the print command is selected in the displayed screen in a state that the application program 41 (for example, viewer program 44) has been booted up. This selection causes the printer driver program 46 to be booted up. When a print start command is inputted by the "start" button during the display of menu for setting printing conditions, the printer driver program 46 produces print data recognizable by the printer 30. Specifically, using color conversion data and color conversion programs, the program 46 converts the image data into bit image data composed of four colors of C (cyan), M (magenta), Y (yellows) and B (black) and then sends the four-color bit image data, together with necessary control codes, to the printer 30.

Upon receiving those data and codes, the printer 30 stores the bit image data into the print buffer 34 shown in FIG. 1, and then reads the stored bit image data to print them on a recording material, such as a paper, with the print head 35. Such output is repeated line by line until the print of data for one page is completed. When completing the data print for one page, the printer driver program 46 notifies the viewer program 44 of its completion.

The foregoing image forming method, which has been used from the past, is preferably applicable to printing followed by data processing executed in the PC 1, as in the cases that image data scanned by the scanner 20 are pasted in text data or processing of image data is performed by the PC 1.

Next, the configuration and operation concerning the "image direct-forming mode will be described. The image direct-forming mode is a mode in which image data obtained by the scanner is directly transmitted to the printer (without passing through the PC) and printed by the printer.

The simplest system to achieve the image direct-forming mode will be first described. In this system, a program for controlling a specific printer is stored in memory means composed of a ROM etc. previously installed in the scanner. By operating keys and others disposed on the scanner itself, image data scanned by the scanner are converted to specified data and then sent out to the printer, and concurrently, by controlling the printer from the scanner, images are formed on recording materials such as papers. However, in the case of the direct-forming of images instructed by the scanner as described above, it is required that, for each kind of printer, the scanner should have a certain adjusting means for color conversion data, color conversion programs, or the like. Therefore, the data or programs which should be stored in the scanner necessarily increases.

To overcome this, in the present invention, the scanner 20 is provided with the flash EEPROM 28 serving as nonvolatile and rewritable memory means. In operation, when the application program 41 and scanner driver program 45 both belonging to the scanner 20 are installed, at least either one of the color conversion data or color conversion programs is downloaded from the PC 1 to the flash EEPROM 28. This enables image printing through a direct output of image data scanned by the scanner 20 to the printer 30 without routing image data to the PC 1.

At least either one of the color conversion data or color conversion programs is downloaded into the HDD 10 of the PC 1 after the scanner driver program 45 has been installed. In the present embodiment, design is done such that the scanner driver program 45 is first installed in a condition that the printer driver program 46 adapted to a machine type of the printer 30 has already been installed. This installation is followed by the downloading of the printer driver program 46 used at present (i.e., the color conversion data or color conversion programs in conformity with a machine type of the printer 30) to the flash EEPROM 28 of the scanner 20.

Figure 4A:
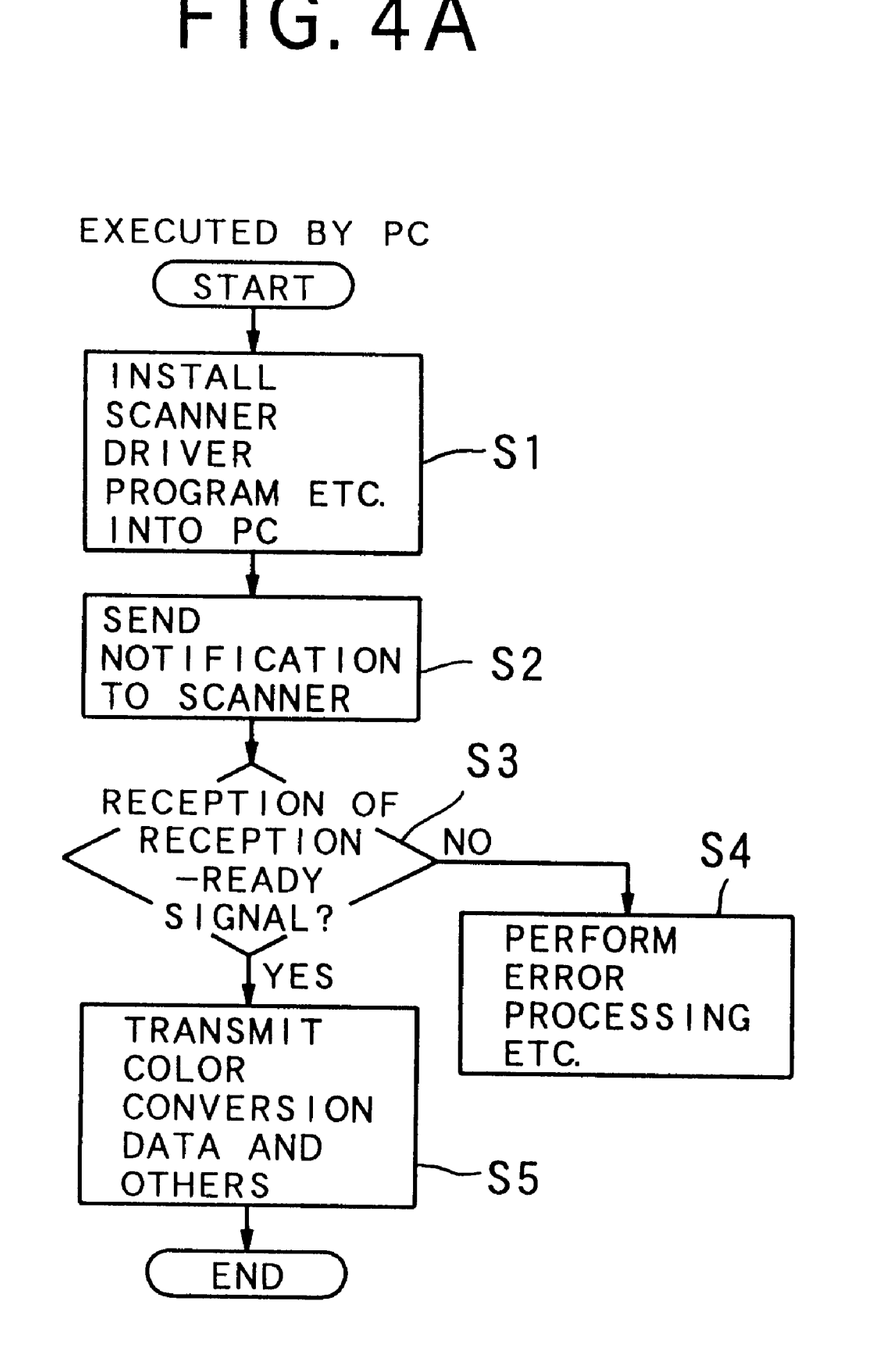
FIGS. 4A and 4B are flowcharts showing the transmission and reception of printer-controlling data or programs in the first embodiment.
Figure 4B:
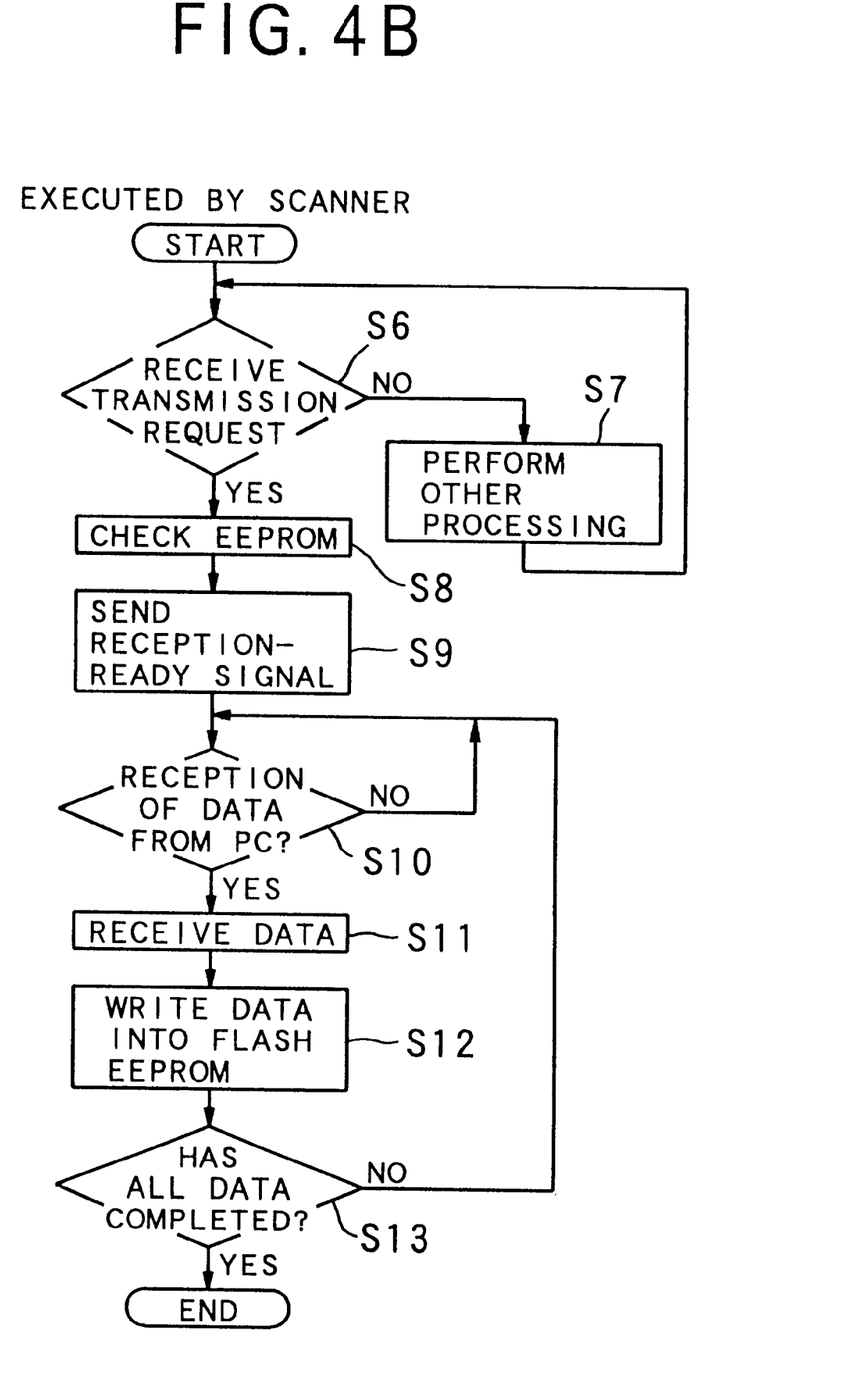

Specific procedures are illustrated by FIGS. 4A and 4B, which show processing of printer-controlling data or programs transmitted and received between the PC 1 and the scanner 20. The procedure represented in FIG. 4A is carried out by the PC 1, while that in FIG. 4B by the scanner 20. As shown in FIG. 4A, when the installed programs have been booted up, first of all, the general scanner driver program 45 and other programs are installed into the PC 1 (step S1). Next, a notification of transmitting color conversion data and others is sent out to the scanner 20 (step S2). The PC 1 waits for a reception-ready signal issued by the scanner 20 (step S3). When the reception-ready signal is not received for some reason (step S3, NO), error processing is done for requesting the re-boot of the installed programs or any other countermeasures (step S4). On the other hand, when the reception-ready signal comes from the scanner 20, color conversion data and other necessary information adapted to a machine type of the printer 30 are transmitted to the scanner 20 by the scanner driver program 45 (step S5).

Concurrently with the above processing, the scanner 20 will perform the procedure represented in FIG. 4B. First, it is determined if the notification of transmitting color data or the like is sent out from the PC 1 (step S6). If No, a step of other processing including a determination whether a reading start command has come or not is performed to wait for the notification which might have been sent out from the PC 1 (step S7). When the notification has come (step S6, YES), the EEPROM 28 is checked (step S8) and a reception-ready signal is sent out to the PC 1 (step S9). Then, it is determined whether or not data is sent from the PC 1 (step S10). If data have been sent from the PC 1 (step S10, YES), the data is received (step S11), and then written into the flash EEPROM 28 (step S12). This reception and writing are repeated until all the data sent from the PC 1 is completed in the reception and writing (step S13). Upon completion (step S13, YES), the operation of the download program is ended.

In the present invention, time events at which the downloading of the color conversion data or the like is executed is not limited to the above. For example, the downloading may be executed every time when the power of the PC 1 is first activated after the scanner 20 and the PC 1 have been connected with other, or the downloading program may be booted up at any appropriate times.

It is not necessarily required that color conversion data and color conversion programs should frequently be reloaded in a byte unit. It is enough that they are reloaded at one time only when the printer is changed into another one. Hence, full-featured type EEPROMs, rewritable in a byte unit, are not always necessary to be used, while flash memories erasable in all the bits or in a block unit may give a satisfactory function. Compared with full-featured type EEPROMs, flash EEPROMs are less expensive per bit and also of lower-cost in printing. Yet, storing data such as the foregoing color conversion data requires a memory of a certain sufficient capacity. In this respect, flash EEPROMs are more desirable than full-featured type EEPROMs, because the former is generally larger in memory capacity than the latter.

Figure 5A:
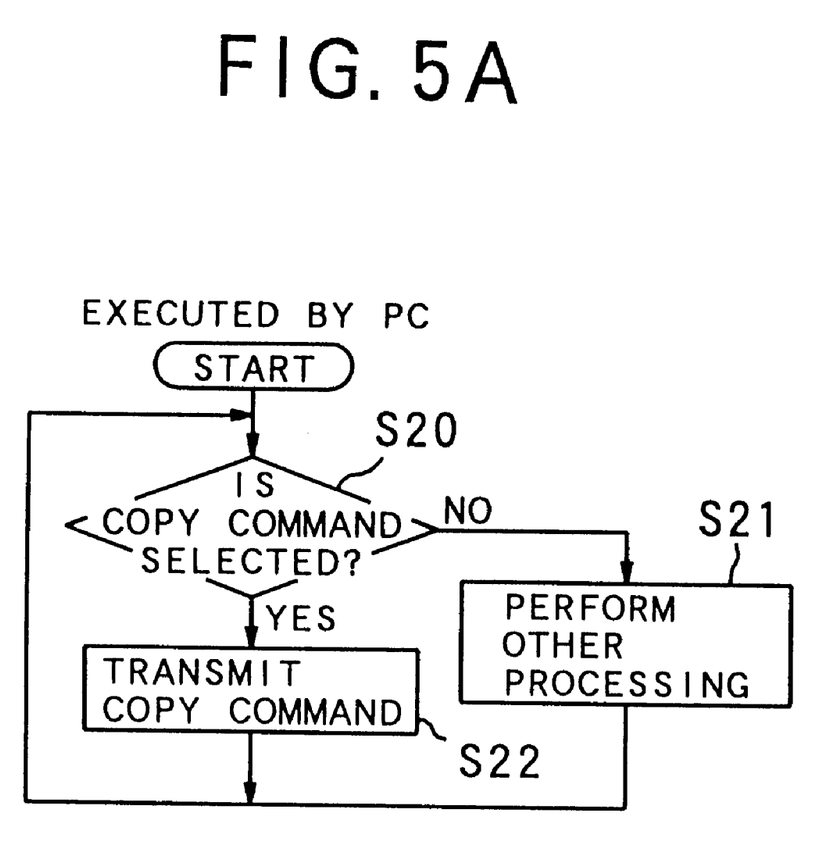
FIGS. 5A–5C are flowcharts showing the output operation of image data from a printer in the first embodiment, the image data being scanned by a scanner.
Figure 5B:
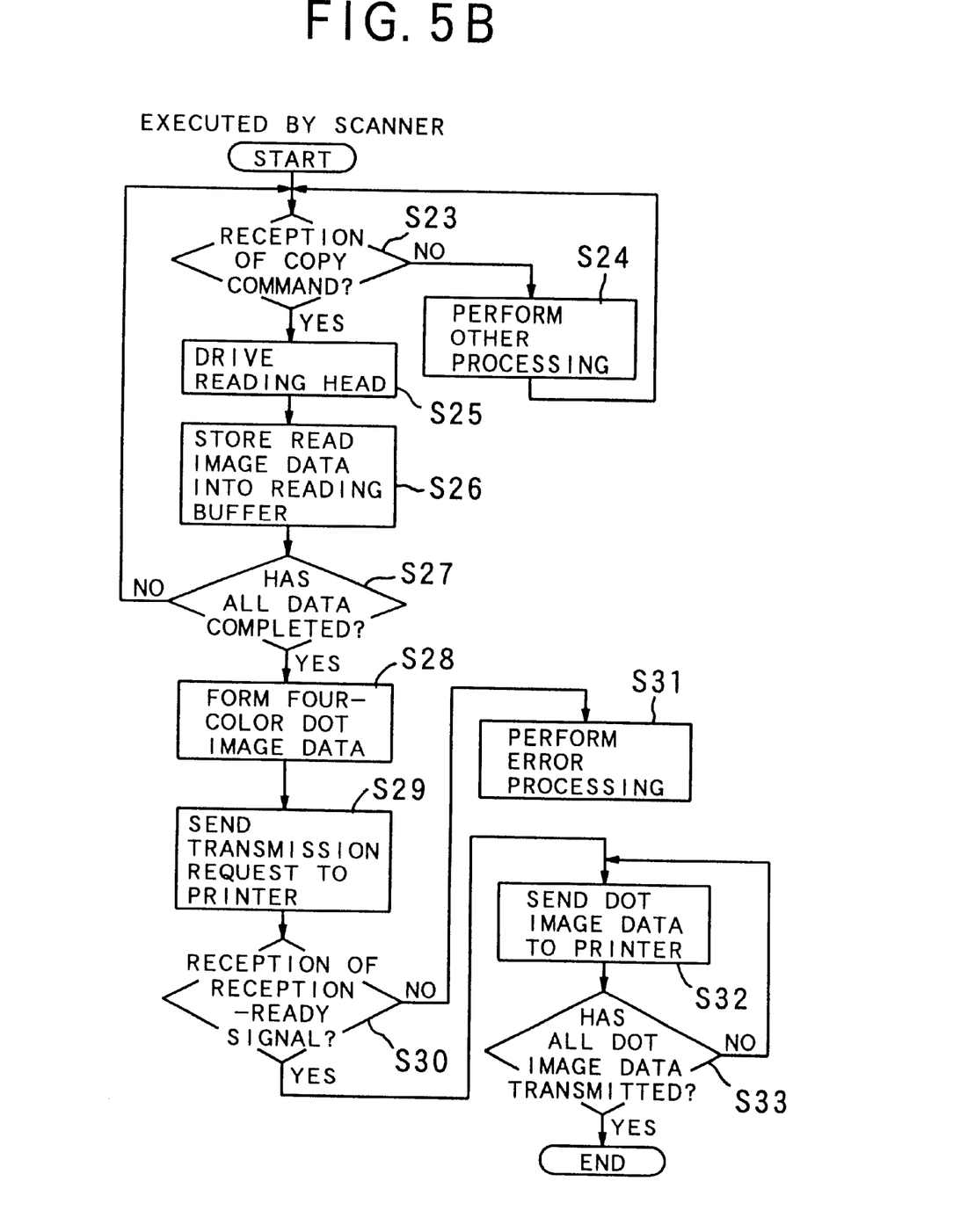
Figure 5C:
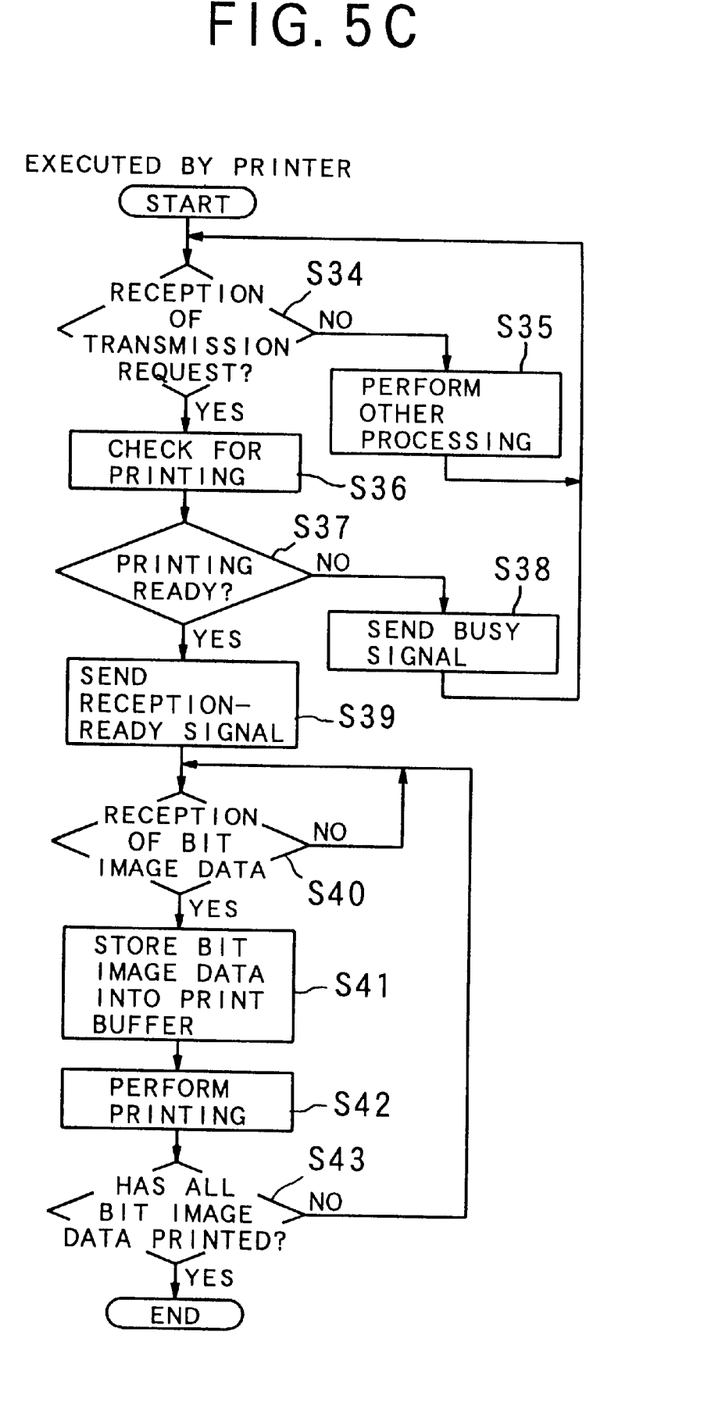

In the embodiment, a copy command is prepared as selecting means. This command is used to select "image direct-forming mode" in the main menu 43 included in the application program 41 installed together with the scanner driver program 45. When the copy command is selected (i.e., a "copy" button is clicked on the main menu screen), a command for starting copy is sent out to the scanner 20 via the scanner driver program 45. FIGS. 5A–5C show flowcharts exemplifying procedures from the start of copy, which will be described below. Those procedures in FIGS. 5A–5C are carried out by the PC 1, the scanner 20, and the printer 30, respectively.

In the PC 1, first, it is determined if the copy command is selected in the main menu 43 provided by the application program 41 (step S20). When the copy command has not been selected, the processing is then passed to other processing by which whether other commands are selected or not is still determined (step S21). Then the selection of the copy command is waited for (step S20). When the copy command has been selected (step S20, YES), the copy command is transmitted to the scanner 20 by way of the scanner driver program 45 (step S22).

Concurrently with the above processing, the scanner 20 performs the procedure shown in FIG. 5B. It is determined if the copy command has come from the PC 1 or not (step S23). When the copy command has not come yet, another step is activated, where it is determined if a reading start command for only the ordinary scanning has come and other necessary operations are executed (step S24). The copy command is waited for with steps S23 and S24 repeated. In the case that the copy command has received (step S23, YES) the reading head 24 is driven to start scanning (step S25). Then image data read are temporarily stored into the reading buffer memory 25 (step S26). These operations are repeated until all the image data are read (step S27, NO). The processing comes out of the closed loop when all the image data have been read (step S27, YES). Then, based on the image data thus scanned, four-color dot image data of CMYK are formed in conformity with the color conversion data etc. stored in the flash EEPROM 28 (step S28). Then a request for transmission is sent out to the printer 30 (step S29). Then the scanner waits for a reception-ready signal from the printer 30 (step S30). If the reception-ready signal cannot be received for some reason (step S30, NO), error processing is executed (step S31), whereas if the signal has been received (step S30, YES), dot image data are sent out to the printer 30 on a procedure in agreement with the specification of the printer 30 (step S32). These steps are continued until all the dot image data are sent out.

Further, concurrently with the above operation of both the PC 1 and the scanner 20, the printer 30 performs the procedure illustrated in FIG. 5C. The printer 30 waits for the request for transmission which will be sent out from the scanner 20 (step S34). When the request has not come yet (step S34, NO), other processing such as waiting for other commands is executed (step S35), thereby providing a command-waiting state. Since the scanner 20 stores programs for controlling the printer, plus the color conversion data etc., and it is possible to transmit data or commands in the same manner as the PC 1, it is not necessary to discriminate data between the PC 1 and the scanner 20.

When the request for transmission has been received (step S34, YES), the printer examines whether it is ready for printing or not (step S36). If not ready (step S37, NO), processing for transmitting a busy signal and others is performed (step S38). In contrast, if ready, a ready signal is sent out (step S39), and in response to arrival of the bit image data from the scanner 20 (step S40, YES), the bit image data are stored into the print buffer 34 (step S41), and the print head 35 is driven for printing (step S42). The above steps for receiving data and printing the received data are continued until the end of the bit image data, and the print processing ends when all the bit image data has been printed (step S43).

As described above, like copy machines, image data read by the scanner 20 can immediately be printed by the printer 30. Since the read image data are not routed to the PC 1, higher-speed printing can steadily be achieved by the image direct-forming mode.

Furthermore, the present embodiment eliminates the necessity of previously storing into the memory means of the scanner 20 the color conversion data and programs for various types of color printers. Thus, by avoiding an increase in amounts of data or programs stored or installed in the scanner, a simplified-configuration and higher-speed image forming system can be provided using the scanner 20 and printer 30.

Thus, even compared with one conventionally-proposed direct forming configuration in which a scanner and a printer are directly connected with each other and printer-controlling programs are stored in a ROM disposed in the scanner, the system which operates under the image direct-forming mode of the invention has an absolute advantage in that amounts of data or programs stored in memory means of the scanner are remarkably reduced, in the use of various types of color printers requiring different color conversion data or programs depending on characteristics of ink or printing methods.

[II] Second Embodiment

Figure 6:
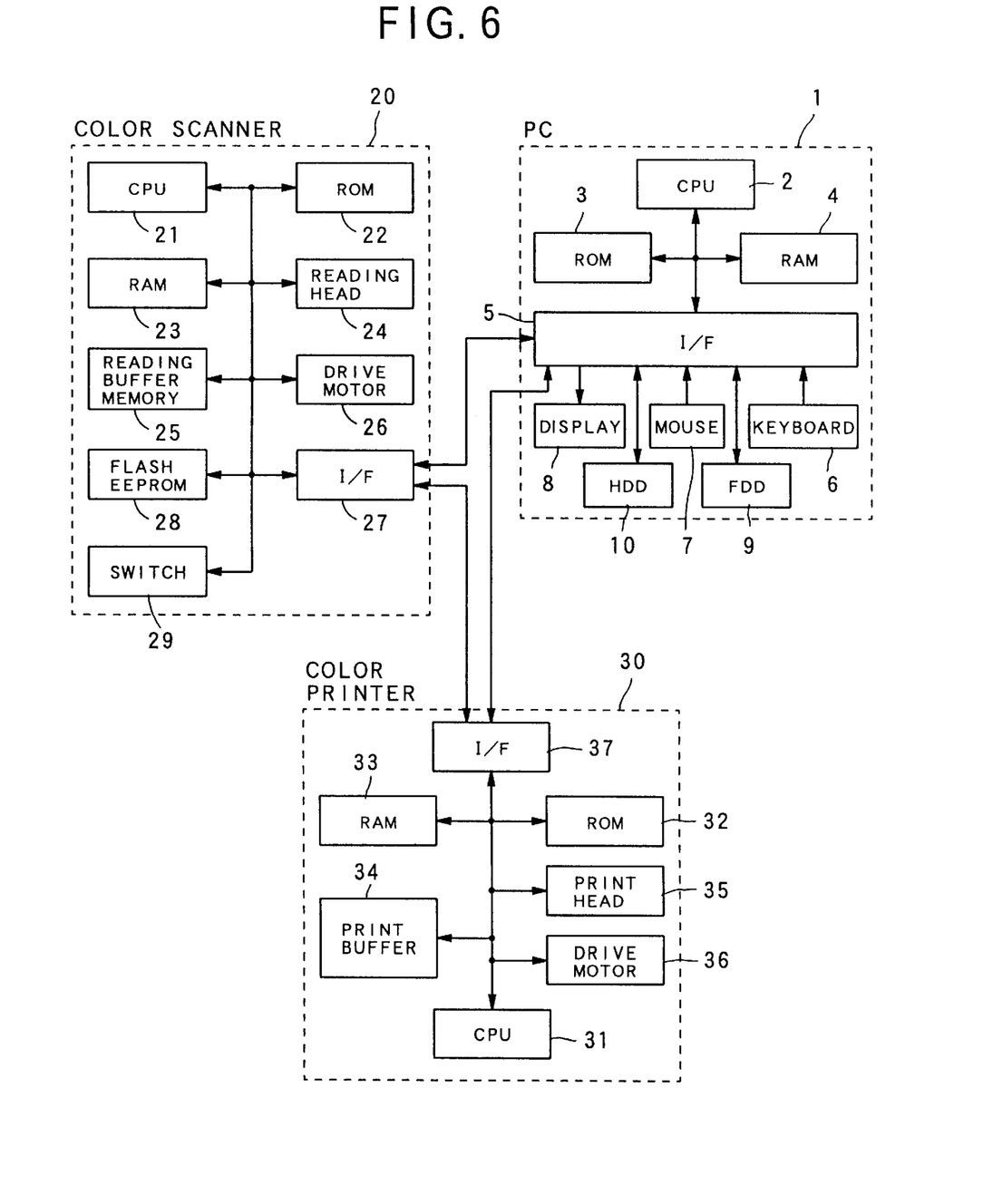
FIG. 6 is a block diagram illustrating a hardware configuration of an image forming system according to a second embodiment of the present invention.

A second embodiment of the present invention will now be explained in conjunction with FIG. 6. In an image forming system of the second embodiment, the constructive units common to the first embodiment will be given the same reference numerals as those and the explanation will be omitted.

While in the first embodiment the PC 1 is constructed to send out a copy command to carry out processing in the image direct-forming mode, a means for selecting the mode is provided in the scanner 20 in the second embodiment. That is, as shown in FIG. 6, the scanner 20 is provided with a switch 29 which functions as such a selecting means. Operating the switch 29 permits the system to select the image direct-forming mode.

Provided that the flash EEPROM 28 is downloaded with at least either one of color conversion data or color conversion programs, operating the switch 29 permits the printer 30 to produce images based on image data scanned by the scanner 20, even when the PC 1 is in the power-off state. Thus, printing images can be more simplified in operation and hardware configuration.

In addition to the configuration described in the foregoing embodiments, a variety of variants applicable to the present invention can be exemplified as below.

First, data or programs downloaded from the PC 1 to the scanner 20 are not restricted to the color conversion data or color conversion programs. Alternatively, a program itself used to output four color bit image data in agreement with the specification of a printer may be downloaded from the PC 1 to the scanner 20. This makes it possible to increase the types of printer which can be used.

Although in the foregoing embodiments the scanned data are converted into bit image data in either the PC 1 or the scanner before they are sent out to the printer, the present invention is not limited to this manner. For example, the printer may be provided with a memory (e.g. ROM) to store a program for converting data written by a page description language into bit image data. In this case, data written by the page description language is sent to the printer which converts it into bit image data.

Further, in the foregoing embodiments, an ink-jet type of printer is used as an image forming apparatus. The present invention can be applied to printers or other printing apparatus utilizing an electronic photo system.

Further, the present invention is not limited to downloading color conversion data or color conversion programs into the scanner (that downloading is necessary in the use of color printers). Alternatively, when a monochrome (black-and-white) printer is employed, the present invention is constructed such that density data, gradation data, or others are downloaded to the scanner.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning an range of equivalency of the claims are therefore intended to be embraced therein.

What we claim is:

1. An image forming system comprising:
    an image forming apparatus for forming an image on a recording material using image data produced from image information represented on an object;
    a host apparatus comprising:
        first memory for storing control data or a program being set according to the image forming apparatus and being executed for controlling said image forming apparatus; and
        control unit for outputting the control data or the program stored in the first memory at given time event; and
    a scanner comprising:
        an image reading unit for reading the image formation on the object and generating the image data corresponding to the information;
        a second memory being rewritable and having a memory capacity capable to store the control data or the program which are associated with said image forming apparatus; and
        a control unit for storing, into the second memory, the control data or the program outputted from said host apparatus, for processing the image data generated by the image reading unit according to the control data or the program stored, and for outputting the processed image data directly to said image forming apparatus and controlling the image forming apparatus, wherein the control unit in the scanner downloads the control data or the program outputted from the host apparatus at a predetermined timing.

2. The system according to claim 1, wherein said host apparatus further comprising a selecting unit for selecting one of an image direct-forming mode in which image data corresponding to the image information are directly sent from said scanner to said image forming apparatus and an image indirect forming mode in which the image data are sent from said scanner to said image forming apparatus through said host apparatus.

3. The system according to claim 1, wherein said scanner further comprising a selecting unit for selecting one of an image direct-forming mode in which image data corresponding to the image information are directly sent from said scanner to said image forming apparatus and an image indirect forming mode in which the image data are sent from said scanner to said image forming apparatus through said host apparatus.

4. The system according to claim 1, wherein said image forming apparatus is exchangeably connectable to the scanner, and said control unit in the host apparatus outputs the control data or the program corresponding to the image forming apparatus which is connected to the scanner.

5. The system according to claim 1, wherein the given time event includes a time event for setting of an operational environment of said scanner.

6. The system according to claim 5, wherein a program for driving said scanner is installed in said host apparatus, and the setting of the operational environment of said scanner includes an installation of the program for driving said scanner in said host apparatus or an activation of power of said host apparatus.

7. The system according to claim 1, wherein the control data and the program include color conversion data and a color conversion program for printing a color image.

8. The system according to claim 1, wherein the program includes an interface program intervening between said host apparatus and said image forming apparatus.

9. The system according to claim 7, wherein the program includes an interface program intervening between said host apparatus and said image forming apparatus.

10. The image forming system according to claim 1, wherein the predetermined timing comprises a timing at which an application program or a scanner driver program is installed into the scanner.

11. A scanner connected to a host apparatus and an image forming apparatus for forming an image on a recording material using image data produced from image information represented on an object, the scanner comprising:
    an image reading unit for reading the image information on the object and generating image data according to the image information;
    a memory being rewritable and having a memory capacity for storing control data or a program for controlling said image forming apparatus, the control data and the program corresponding to said image forming apparatus; and
    a control unit for storing, into the memory, the control data or the program outputted from said host apparatus so that the image reading unit reads the image information on the object and produces the image data, for processing the image data on the basis of the control data and the program stored, and for outputting the processed image data directly to said image forming apparatus and controlling the image forming apparatus, wherein the control unit in the scanner downloads the control data or the program outputted from the host apparatus at a predetermined timing.

12. The scanner according to claim 11, wherein said control unit stores the control data or the program in response to a given signal indicative of an image direct-forming mode in which image data corresponding to the image information are directly sent from said scanner to said image forming apparatus.

13. The scanner according to claim 11, wherein the control data and program include color conversion data and a color conversion program for printing a color image.

14. The scanner according to claim 11, wherein the program includes an interface program intervening between said host apparatus and said image forming apparatus.

15. The scanner according to claim 13, wherein the program includes an interface program intervening between said host apparatus and said image forming apparatus.

16. The scanner according to claim 11, further comprising a selecting unit for generating a signal indicative of an image direct-forming mode, in which image data corresponding to the image information are directly sent from said scanner to said image forming apparatus, in response to selection of the image direct-forming mode.

17. The scanner according to claim 11, wherein the predetermined timing comprises a timing at which an application program or a scanner driver program is installed into the scanner.

18. The scanner according to claim 11, wherein the rewritable memory comprises a flash EEPROM.

19. An image forming apparatus comprising:
   an image forming unit for forming an image on a recording material using image data produced from image information represented on an object; and
   a scanner unit connected to said image forming unit, comprising:
      an image reading unit for reading the image information on the object and generating the image data corresponding to the information;
      a memory being rewritable and for storing a control data or a program which controls said image forming unit;
      a download unit for downloading the control data or the program from a host apparatus at a predetermined timing; and
      a control unit for directly transmitting the image data generated by the image reading unit to said image forming unit and directly controlling said image forming unit to form the image from the transmitted image data based on the control data or the program stored in the memory.

20. The image forming apparatus according to claim 19, wherein said scanner unit is configured independently of and separately from said image forming unit.

21. The image forming system according to claim 19, further comprising a unit that downloads the control data or the program from an external device to the rewritable memory.

22. The image forming system according to claim 19, wherein the control data and program include color conversion data and a color conversion program for printing a color image.

23. The image forming apparatus according to claim 19, wherein the predetermined timing comprises a timing at which an application program or a scanner driver program is installed into the scanner unit.

* * * * *